US009820010B2

(12) United States Patent
Alsina et al.

(10) Patent No.: US 9,820,010 B2
(45) Date of Patent: *Nov. 14, 2017

(54) ADAPTIVE MEDIA CONTENT SCRUBBING ON A REMOTE DEVICE

(71) Applicant: Apple Inc., Cupertino, CA (US)

(72) Inventors: Thomas Matthieu Alsina, Mountain View, CA (US); Bob Bradley, San Jose, CA (US); Alan C. Cannistraro, San Francisco, CA (US); Scott Forstall, Mountain View, CA (US); Amandeep Jawa, San Francisco, CA (US); Nicholas V. King, San Jose, CA (US); Lucas Newman, San Francisco, CA (US); Daniel Trent Preston, Campbell, CA (US); Jai Chulani, Los Altos, CA (US); Jeffrey Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,578

(22) Filed: Jun. 26, 2015

(65) Prior Publication Data
US 2015/0304738 A1    Oct. 22, 2015

Related U.S. Application Data

(63) Continuation of application No. 14/136,905, filed on Dec. 20, 2013, now Pat. No. 9,071,792, which is a
(Continued)

(51) Int. Cl.
H04N 5/44       (2011.01)
H04N 21/6587    (2011.01)
(Continued)

(52) U.S. Cl.
CPC ....... H04N 21/6587 (2013.01); H04N 5/4403 (2013.01); H04N 21/4126 (2013.01);
(Continued)

(58) Field of Classification Search
CPC .................. H04N 5/4403; H04N 21/4325
(Continued)

(56) References Cited

U.S. PATENT DOCUMENTS 5,926,624 A    7/1999  Katz et al.
6,965,770 B2   11/2005 Walsh et al.
(Continued)

FOREIGN PATENT DOCUMENTS

CN    101150636    3/2008
CN    101521797    9/2009
(Continued)

OTHER PUBLICATIONS

Intel gives us demo of WiDi HD wireless display tech [Viewed on the Internet on Mar. 18, 2016] Viewed on the Internet: <URL: https://www.youtube.com/watch?v=qwwscuOn9vA> Published Jan. 11, 2010.
(Continued)

Primary Examiner — Vernal Brown
(74) Attorney, Agent, or Firm — Fish & Richardson P.C.

(57) ABSTRACT

Systems and techniques are disclosed for controlling, from a mobile device, media content stored on the mobile device to a media client for presentation on a display device. Data can be provided from the mobile device to the media client for identifying the location of the media content and a playback time. Based on the data, the media client can obtain a portion of the media content associated with the playback time. Also, playback of the media content on the display device can be controlled by a user of the mobile device.

15 Claims, 9 Drawing Sheets

Related U.S. Application Data continuation of application No. 12/895,694, filed on Sep. 30, 2010, now Pat. No. 8,614,625.

(60) Provisional application No. 61/378,904, filed on Aug. 31, 2010.

(51) Int. Cl.
| | | |
|---|---|---|
| H04N 21/41 | (2011.01) | |
| H04N 21/432 | (2011.01) | |
| H04N 21/436 | (2011.01) | |
| H04N 21/845 | (2011.01) | |
| H04N 21/472 | (2011.01) | |

(52) U.S. Cl.
CPC ... *H04N 21/4325* (2013.01); *H04N 21/43615* (2013.01); *H04N 21/47202* (2013.01); *H04N 21/8455* (2013.01)

(58) Field of Classification Search
USPC ............... 725/81; 348/734; 340/5.61
See application file for complete search history.

(56) References Cited

U.S. PATENT DOCUMENTS

| | | | |
|---|---|---|---|
| 7,665,115 | B2 | 2/2010 | Gallo et al. |
| 7,925,244 | B2 | 4/2011 | Minor |
| 8,614,625 | B2 | 12/2013 | Alsina et al. |
| 9,071,792 | B2 | 6/2015 | Alsina et al. |
| 2005/0039133 | A1 | 2/2005 | Wells et al. |
| 2005/0286546 | A1 | 12/2005 | Bassoli et al. |
| 2006/0002681 | A1 | 1/2006 | Spilo et al. |
| 2006/0161635 | A1 | 7/2006 | Lamkin et al. |
| 2006/0288392 | A1* | 12/2006 | Fleming ............... H04N 5/765 725/94 |
| 2007/0055743 | A1 | 3/2007 | Pirtle et al. |
| 2007/0136488 | A1 | 6/2007 | Cho et al. |
| 2007/0198633 | A1 | 8/2007 | Thibeault |
| 2008/0028023 | A1 | 1/2008 | Locke |
| 2008/0028092 | A1* | 1/2008 | Shen ................... H04N 7/147 709/231 |
| 2008/0104644 | A1 | 5/2008 | Sato et al. |
| 2008/0183843 | A1 | 7/2008 | Gavin et al. |
| 2009/0249222 | A1 | 10/2009 | Schmidt et al. |
| 2009/0259711 | A1 | 10/2009 | Drieu et al. |
| 2009/0282443 | A1 | 11/2009 | Kim |
| 2009/0300679 | A1 | 12/2009 | Hiroi |
| 2010/0293598 | A1 | 11/2010 | Collart et al. |
| 2012/0050012 | A1 | 3/2012 | Alsina et al. |
| 2014/0176811 | A1 | 6/2014 | Alsina et al. |

FOREIGN PATENT DOCUMENTS

| | | |
|---|---|---|
| CN | 101646992 | 2/2010 |
| JP | 2003244289 | 8/2003 |
| JP | 2008113301 | 5/2008 |
| JP | 200960512 | 3/2009 |
| JP | 2009055099 | 3/2009 |
| JP | 2009290557 | 12/2009 |
| WO | WO 2008117586 | 10/2008 |

OTHER PUBLICATIONS

International Preliminary Report on Patentability from International Patent Application No. PCT/US2011/049390, filed Aug. 26, 2011, dated Mar. 14, 2013, 7 pages.

International Search Report and Written Opinion of the International Searching Authority, PCT Application Serial No. PCT/US2011/049390, dated Jan. 17, 2011, 12 pages.

"UPnP AV Architecture: 1—Standardized DCP—Document version 1.1," Sep. 30, 2008, XP002662644, Retrieved from the Internet: URL:http://upnp.org/specs/av/UPnP-av-AVArchitecture-v1-20080930.pdf, [retrieved on Nov. 2, 2011], 30 pages.

Allegro Software Development Corporation: "Networked Digital Media Standards. A UPnP / DLNA Overview," Internet Citation, Oct. 26, 2006 (Oct. 26, 2006), p. 25PP, XP007906876, Retrieved from the Internet: URL:http://www.allegrosoft.com/downloads/UPnP_DLNA_White_Paper.pdf, [retrieved on Jan. 20, 2009].

Byungsoo Lim et al: "UPnP AV Transport Service Using the Add-in System," Next Generation Mobile Applications, Services and Technologies, 2009. NGMAST '09. Third International Conference on, IEEE, Piscataway, NJ, USA, Sep. 15, 2009, pp. 52-57, XP031569304, ISBN: 978-0-7695-3786-3.

* cited by examiner

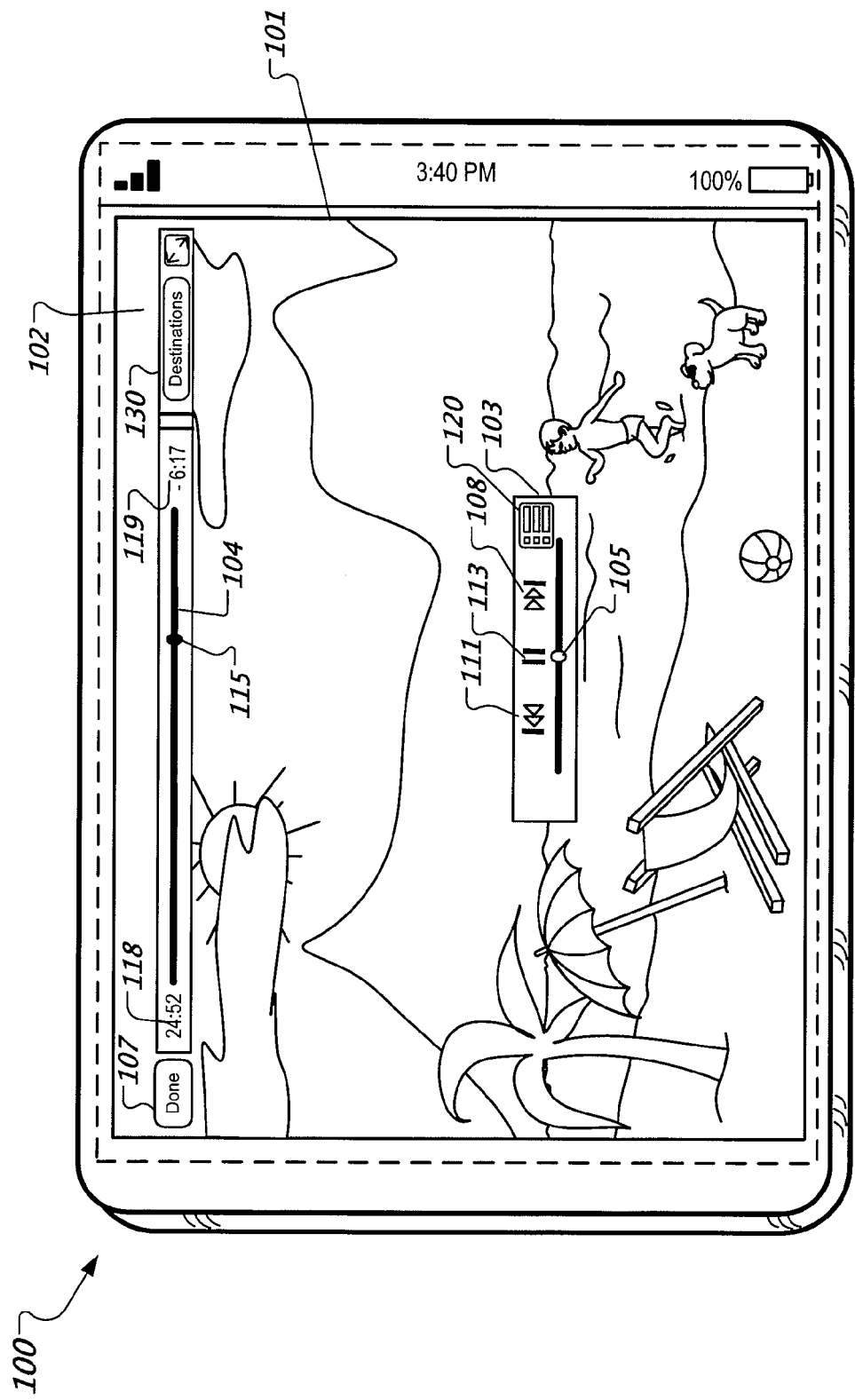

ADAPTIVE MEDIA CONTENT SCRUBBING ON A REMOTE DEVICE

This application is a continuation of U.S. patent application Ser. No. 14/136,905, entitled "Adaptive Media Content Scrubbing on a Remote Device," filed on Dec. 20, 2013, which is a continuation of U.S. patent application Ser. No. 12/895,694, filed on Sep. 30, 2010, which claims priority to and the benefit of U.S. Provisional Application No. 61/378,904 which was filed on Aug. 31, 2010, the entire contents of which are incorporated herein by reference in their entirety.

BACKGROUND

This disclosure relates to presenting items of media content on a display device remotely from a mobile media device.

As media devices and online providers of media content have become more prevalent, the choices of media types and selection of particular media items have grown considerably and will continue to do so. Manufacturers of media devices strive to present this vast array of available media choices to a viewer in a meaningful way. Media content can be presented on a mobile device such as cell phone, PDA, a tablet computer and the like. Media content can also be presented on a TV or a home theater system using a media device such as a digital media receiver or digital media adapter. Such a media device can connect to a network to download digital media files and play them on a home theater system or TV.

SUMMARY

This disclosure describes systems and techniques for controlling, from a mobile device, media content stored on the mobile device to a media client for presentation on a display device coupled to, or integrated with, the media client such as a television. The media content can be stored on the mobile device and presented to a user on the mobile device. A separate media device, such as media client, coupled with the display device can be identified by the mobile device. The media client can be linked to the mobile device over a communications link, such as over a local area network (LAN) or over a wireless peer-to-peer communications link. The user can switch the destination of the presentation of the media content from the mobile device to the display device coupled to the media client. For example, the user can click on a list of destinations on the mobile device and select a destination associated with the media client which switches the presentation of the media content from the mobile device to the display device. The media content can be provided from the mobile device to the media client for presentation on the display device. Also, playback of the media content on the display device can be controlled from the mobile device.

When the destination of the media content is changed from the mobile device to the media client, the mobile device can stop decoding (and decrypting if the media content is encrypted) the media content. A portion of the media content, starting from the location where mobile device left off when the destination was received, can be provided to the media client in encoded (and encrypted) form. The media client can decode (and decrypt) the media content and present the media content on the display device.

To provide the media content to the media client, the mobile device can transmit data (e.g., a URL) to the media client that includes an address (e.g., an Internet Protocol (IP) address) of the mobile device, an asset identifier ("ID") of the media content stored on the mobile device, and a playtime where the media device should begin presenting the media content. Based on the data, the media client can prepare and send a request (e.g., an HTTP request) to the mobile device for a portion of the presentation (e.g. packets of information). Upon receiving the request, the mobile device transmits the requested portion of the presentation. The media client can continue to transmit requests and buffer media content so that the media content can be seamlessly presented on the display device.

The mobile device from which the media content is sent can also control the presentation of the media content by the media client. For example, a user can scrub the presentation of the media content using a control provided by the mobile device. To do so, the mobile device can monitor the status of the presentation of the media content by the media client so that when a scrubbing request is received, the mobile device can scrub from the correct location. While the user is scrubbing the media content at the mobile device, the mobile device can decode (and decrypt) frames (e.g. key frames) of the media content associated with the scrubbing for display on the mobile device. Once a new location in the media content is determined based on the scrubbing input, a new data can be transmitted to the media client with information for the media client to request media content associated with the new location. In some examples, as the scrubbing input is received, commands can be transmitted to the media client to obtain and display frames from the mobile device associated with the scrubbing and present those frames as the scrubbing input is received (e.g. real-time scrubbing).

Details of one or more implementations are set forth in the accompanying drawings and the description below. Other features, aspects, and potential advantages will be apparent from the description and drawings, and from the claims.

DESCRIPTION OF DRAWINGS

FIGS. 1A-1B illustrate an exemplary user interface of a mobile device for presenting digital media items.

Like reference symbols in the various drawings indicate like elements.

DETAILED DESCRIPTION

Overview of Mobile Device

Figure 1B:
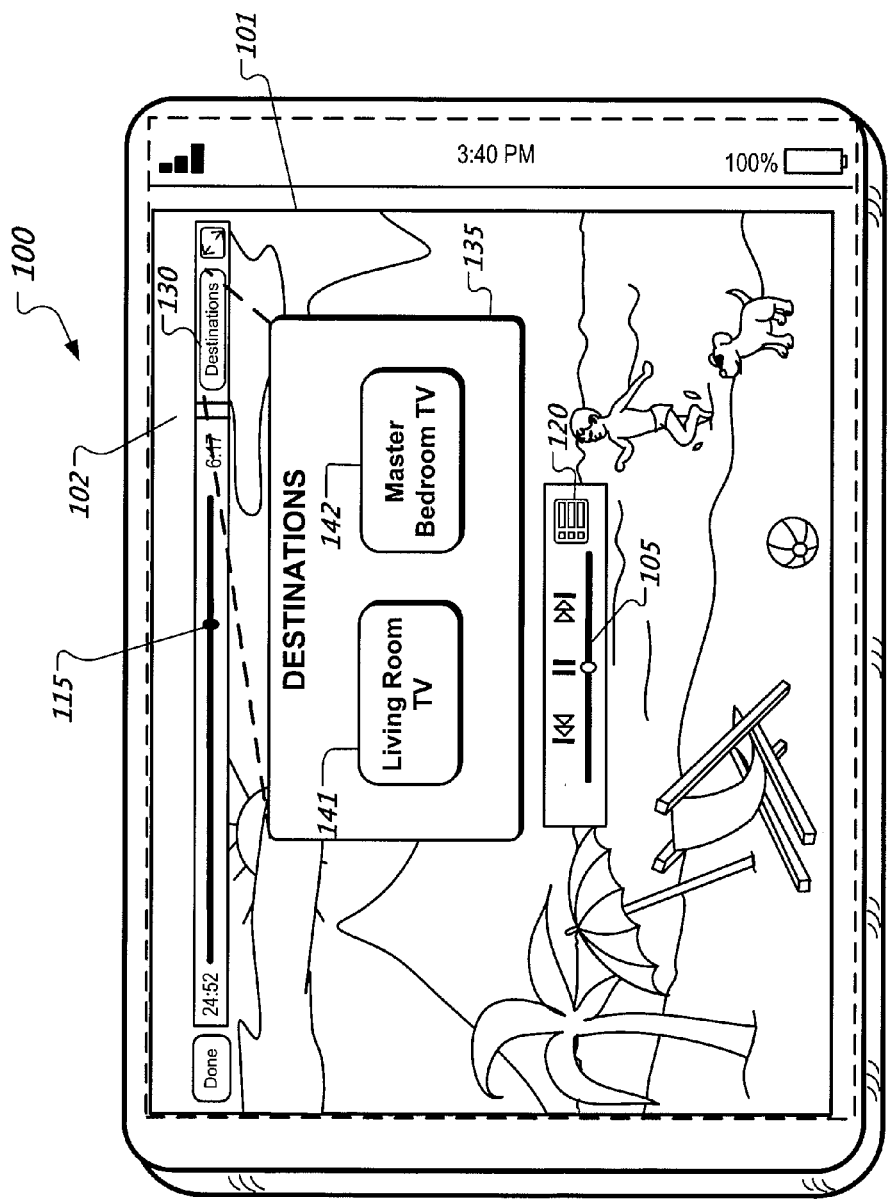

FIG. 1A illustrates an exemplary user interface of mobile device 100 for presenting digital media content items. Mobile device 100 is an electronic device that can present various forms of media content including video content such as movies and/or TV shows, photos, slide media presentations, etc. Media content stored on mobile device 100 can be displayed from mobile device 100 itself. The media content can also be transferred from mobile device 100 to a media client (discussed in more detail in connection with FIG. 3) for presentation by the media client on a display device coupled with the media client.

Mobile device 100 can also control the media presentation of the media content from mobile device 100 or from the media client. For example, during the presentation of the media content on the display device coupled with the media client, mobile device 100 can monitor the status of the presentation of the media content. When a user decides to scrub (e.g. fast forward or rewind) the media content on the display device, the user can provide scrubbing input on mobile device 100 and can view the media content being scrubbed on mobile device 100. Upon selecting a new portion in the presentation, the presentation of the media content from the new portion at the display device can resume.

In some implementations, mobile device 100 can be a portable computer, electronic tablet, electronic book reader, cellular phone, PDA, gaming device or any other mobile device that can present media content. In some implementations, mobile device 100 can include a touch sensitive display or surface (e.g., surface 102) that is responsive to touch input or gestures by one or more fingers or another source of input, e.g., a stylus. Audio can be presented, for example, through a loudspeaker integrated in or coupled to mobile device 100, or through a pair of headphones coupled to a headphone jack of mobile device 100.

In the example shown in FIG. 1A, frame 101 of a media presentation of media content is displayed on touch sensitive surface 102 of mobile device 100. The user interface of mobile device 100 includes controls 103, controls 104, and control 107 for controlling the media presentation. Controls 103 include a slider 105 for adjusting the volume of the presentation, forward button 108 for advancing to a next scene, and back button 111 for navigating to a previous scene. Button 120 can be used to display a list of scenes that can be navigated by the user. Controls 103 also include a play/pause button 113 for playing and pausing the media presentation. Control 104 includes slider 115 that when moved to the right advances the current media presentation and when moved to the left scans backward through the media presentation. As the user scrubs through the media presentation using controls 103 and/or 104, frames associated with the scrubbing input are presented in the user interface. As a user plays or scrubs through the media presentation, the time elapsed is shown at time indicator 118 and the time remaining is shown at time indicator 119. The user interface also includes done button 107. Upon selection of the done button 107, the media presentation terminates. In some examples, accessories connected with the mobile device 100 can be used to control playback (e.g. via a speaker dock, a headset button, a Bluetooth® remote control, etc.). Also, other applications loaded onto mobile device 100 can be used to control playback (such as third-party video players, voice control applications, etc.).

The user interface also includes destinations button 130. As shown in FIG. 1B, upon selection of destinations button 130, destinations pane 135 is displayed. Destinations pane 135 includes additional controls for controlling the physical location for presenting the media presentation stored on mobile device 100. In the example shown, mobile device 100 has detected two destinations where the media presentation can be presented. A user can touch first destination button 141 for presenting the media presentation which is stored on mobile device 100 on a living room TV. Also, user can touch second destination button 142 for presenting the media presentation on a master bedroom TV. When a user selects one or more of the destinations, the media presentation can be provided to those one or more destinations from mobile device 100 for media presentation. Presentation of the media presentation on the selected destination can resume from frame 101, i.e. the frame being displayed when the destination was selected.

Overview of a Media System

Figure 2:
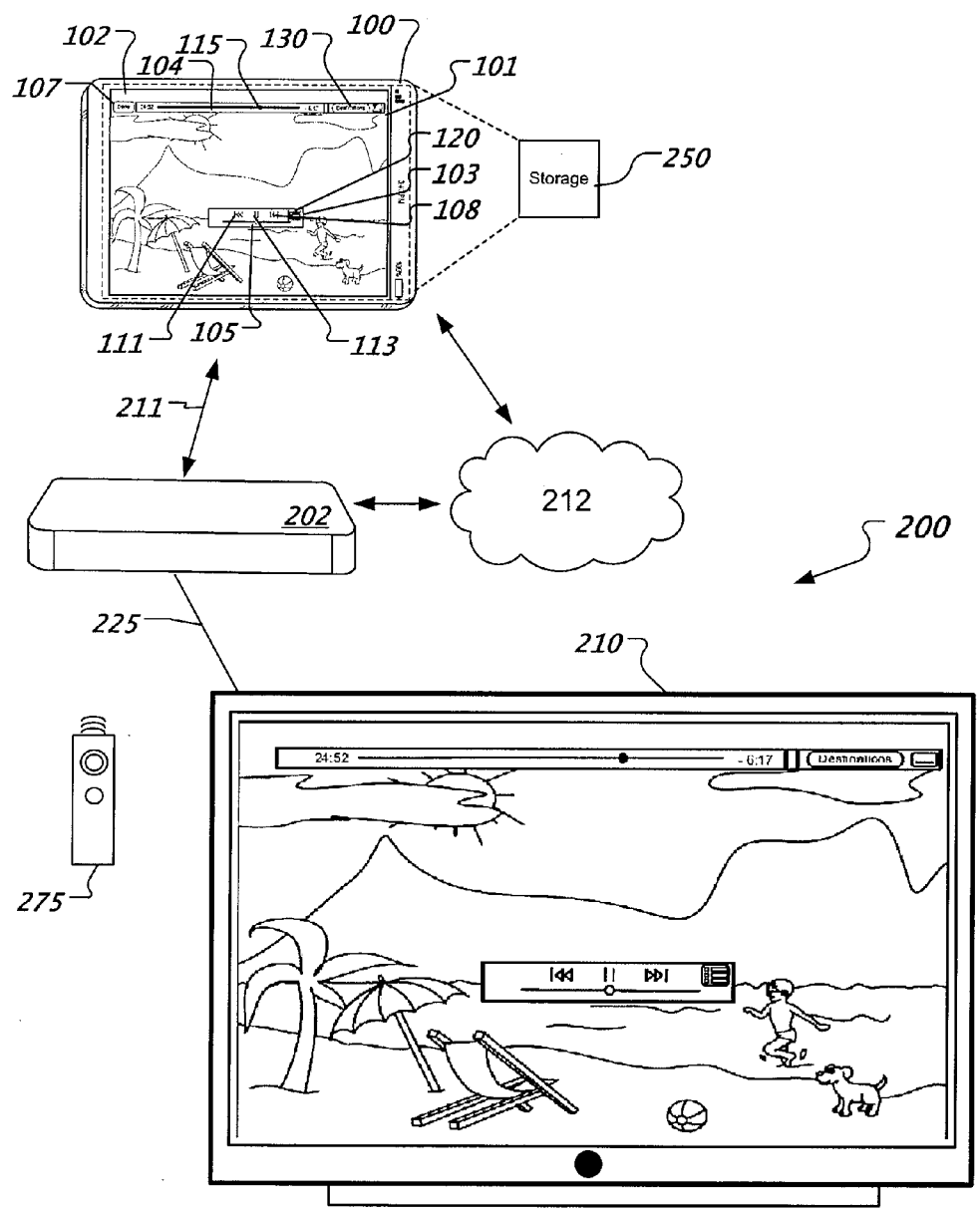
FIG. 2 shows an example media system for presenting media content.

FIG. 2 shows an example media system 200 for presenting media content. Media system 200 includes mobile device 100, media client 202, and display device 210, such as a TV set or monitor. Display device 210 is coupled with media client 202 through media connector 225, such that video and/or audio information output by media client 202 can be presented through display device 210. In some examples, display device 210 can be coupled with the media client in a single integral unit.

Media client 202 can be coupled to mobile device 100 through a direct wireless connection 211 such as a peer-to-peer connection or through a network 212 such as a local area network. Mobile device 100 can communicate with media client 202 through network 212 via a wireless communications link. As such, media client 202 can obtain media content from mobile device 100, such as media content stored on memory 250 on the mobile device 100. Memory 250 can include removable memory connected to the mobile device such as a USB drive, an SD card or the like. Media client 202 can also receive control commands from mobile device 100 for controlling presentation of the media content on display device 210.

When mobile device 100 enters into communication with network 212 (e.g. by coming within wireless range of network 212 or upon being powered on etc.) and/or comes within communication range of wireless connection 211, mobile device 100 can present an indication that one or more potential destinations are available for presenting media content. This indication can be in the form of displaying destination button 130. As shown in connection with FIG. 1B, a user can select an available destination (or multiple destinations) such as display device 210 for presenting media content from mobile device 100. Upon selection of display device 210 as a destination, media content can be provided from mobile device 100 to media client 202 for presentation on display device 210.

In some examples, a list of audio destinations can be presented in destinations pane 135 on mobile device 100 with a list of video destinations. A user can mix one or more of the audio destinations with one or more of the video destinations. Example audio destinations include an audio device coupled with media client 202, audio devices connected to the network 212 (e.g. audio accessories connected via an Airport Express®), a mobile audio device connected wirelessly to media client 202 or to mobile device 100 (e.g. via Bluetooth®), the mobile device 100 itself, etc. Also, media content, such as a media presentation, provided to one or more audio destinations and to one or more video destinations can be synchronized to play the same media content at the same due (e.g. to account for latency). Also, mobile device 100 can display destinations based on the type of the media content. For example, audio-capable destinations can be presented for audio content and video-capable destinations can be presented for video content.

In some examples, a user can use touch input and/or gestures in the user interface of mobile device 100 to select one or more destinations. For example, the user can push, flick, and/or throw media content currently playing on mobile device 100 (or content for presentation) towards another a graphical representation of a destination in order to start playing the media content on that destination. To return playback to mobile device 100, the user could use another touch input or gesture, such as pulling or dragging, to move the media back onto mobile device 100. For multiple destinations, the user interface of mobile device 100 could show graphical representations of each destination during the touch input or gesture, to allow the user to choose which destination(s) should be used.

In some examples, the presentation of the media content can be shown simultaneously from both mobile device 100 and display device 210. In some examples, the presentation of the media content can be switched between being played on mobile device 100 and display device 210. Mobile device 100 can monitor the progress of the presentation on display device 210 by obtaining updates from media client 202. This allows mobile device 100 to stop displaying the presentation while the presentation is playing on display device 210. This facilitates battery preservation in mobile device 100 and allows mobile device 100 to resume the presentation being presented on display device 210 from the proper location upon demand.

For example, when a user wants to scrub the presentation being presented on display device 210, the user can interact with the user interface on the touch sensitive surface 102. If the presentation is not being shown on mobile device 100 (e.g. being presented only on one or more destinations such as display device 210), mobile device 100 can begin to show the presentation upon being touched. The user can use controls 103, 104, and/or 107 on mobile device 100 to control the presentation on display device 210. For example, the user can use controls 104 to scrub through the presentation. As the user scrubs, frames associated with the scrubbing can be shown on mobile device 100. Also, in some examples, the frames associated with the scrubbing can also be displayed at display device 210. Once a location in the presentation has been selected for playback, the presentation can resume at display device 210 from the selected playback location. Also, mobile device 100 can stop showing the presentation to preserve power.

Also, media client remote 275 can be used to control playback by the media client 202. A user can use media client remote 275 to navigate through the media content being displayed by media client 202 on display device 210. When the media client needs to obtain additional media content based on control commands received from media client remote 275, media client 202 can send a request to the mobile device for additional media content. As playback of media content is controlled (e.g. navigated, paused etc.) from media client remote 275, updates can be provided to the mobile device 100 so that playback of audio and/or video from mobile device 100 or from any other destination can be synchronized.

In some examples, mobile device 100 can store and provide media content to media client 202 that mobile device 100 is not configured to playback. For example, display device 210 coupled to media client 202 may be able to playback higher definition content than mobile device 100; media client 202 may have cipher keys that can decrypt more audio formats than mobile device 100. In such an example, mobile device 100 can provide the media content that it is not configured to playback to media client 202 for playback. Also, in some example, media client 202 can be configured to playback a version of the media content in a format that it is configured to playback (e.g. synchronously with the media client 202).

In some examples, mobile device 100 can generate media content for presentation, such as media content associated with a video came during game play. For example, during game play of a video game on mobile device 100, a user can change or add the destination of the presentation of the video game to the display device 210. As a result, mobile device 100 can encode (and/or encrypt) the media content for the video game as it is generated by mobile device 100 and provide the media content to media client 202 for presentation on the display device 210.

For example, mobile device 100 can transmits data (e.g., a URL or URI) to the media client that includes an address (e.g., an IP address) of the mobile device, an asset ID of the media content being generated and presented by mobile device 100. Mobile device can also transmit an indication that the content should be presented on the display device 210 real time as the video game is played. The media client 202 can transmit a request (e.g. an HTTP request) to mobile device 100 for the media content as it is being generated. Mobile device 100 can encode (and/or encrypt) the dynamically generated media content (such as in data packets) and provide it to the media client based on the request. The media client can decode and present the dynamically generated media content real-time with game play. The presentation at the media client can also be in synchronization with presentation of the media content at mobile device 100.

Figure 3:
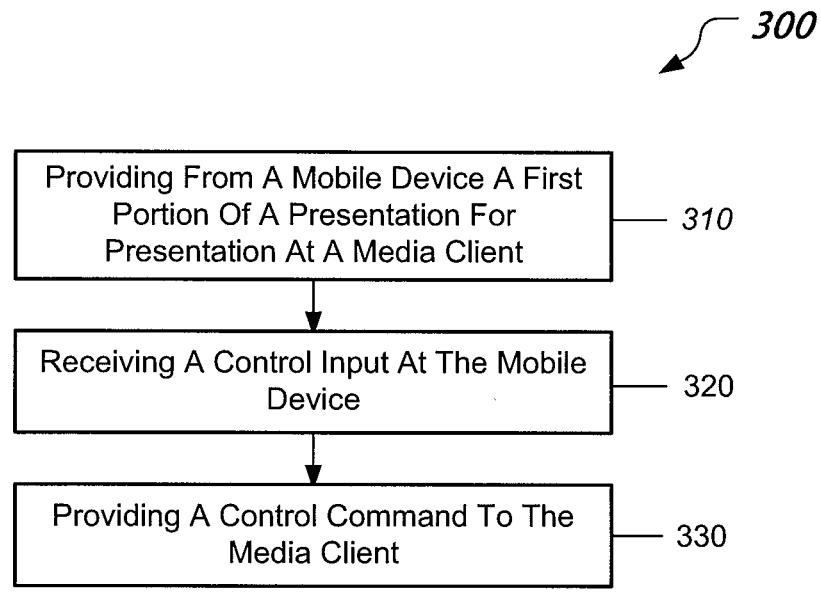
FIG. 3 shows an example process for controlling a presentation.

FIG. 3 shows an example process for controlling a presentation. At 310, a first portion of the presentation is provided from a mobile device to a media client for presentation on a display device coupled with the media client. In some examples, the first portion of the presentation can be provided by the mobile device acting as a server and the media client acting as a server client. The mobile device transmits data (e.g., a URL or URI) to the media client that includes an address (e.g., an IP address) of the mobile device, an asset ID of the presentation stored on the mobile device, and a playtime where the media device should begin presenting the presentation. The data can also include other information for playback, such as a frame rate, a type of the media content (e.g. audio, video, slide presentation etc.), a type of application to be used for playback by the media client, encryption information to allow playback (e.g. encryption information obtained directly from mobile device 100 or an address of a secure server for obtaining such encryption information), cookies for authentication etc. Based on the data, the media client prepares and sends a request (e.g., an HTTP request) to the mobile device for a portion of the presentation. The mobile device transmits the requested portion of the presentation to the media client. This example process of providing a portion of the presentation to the media client can be repeated during the presentation of the portion of the presentation at the display device so that the presentation can proceed seamlessly on the display device.

During the presentation, a control input for controlling the presentation can be received at the mobile device at 320. For example, a pause input can be received at the mobile device. In another example, a scrubbing input can be received at the mobile device. At 330, a control command can be provided to the media client for controlling the presentation on the display device based on the received control input. For example, if a pause input was received at the mobile device, a signal can be transmitted to the media client to pause the presentation. If a scrubbing input was received at the mobile device, a command with a new playtime can be transmitted to the media client. If the media client has already obtained data from the mobile device associated with the new playtime, it can resume from the new playtime. If the media client has not obtained data associated with the new playtime, it can request a data package associated with the new playtime.

Presenting Media Content

Figure 4:
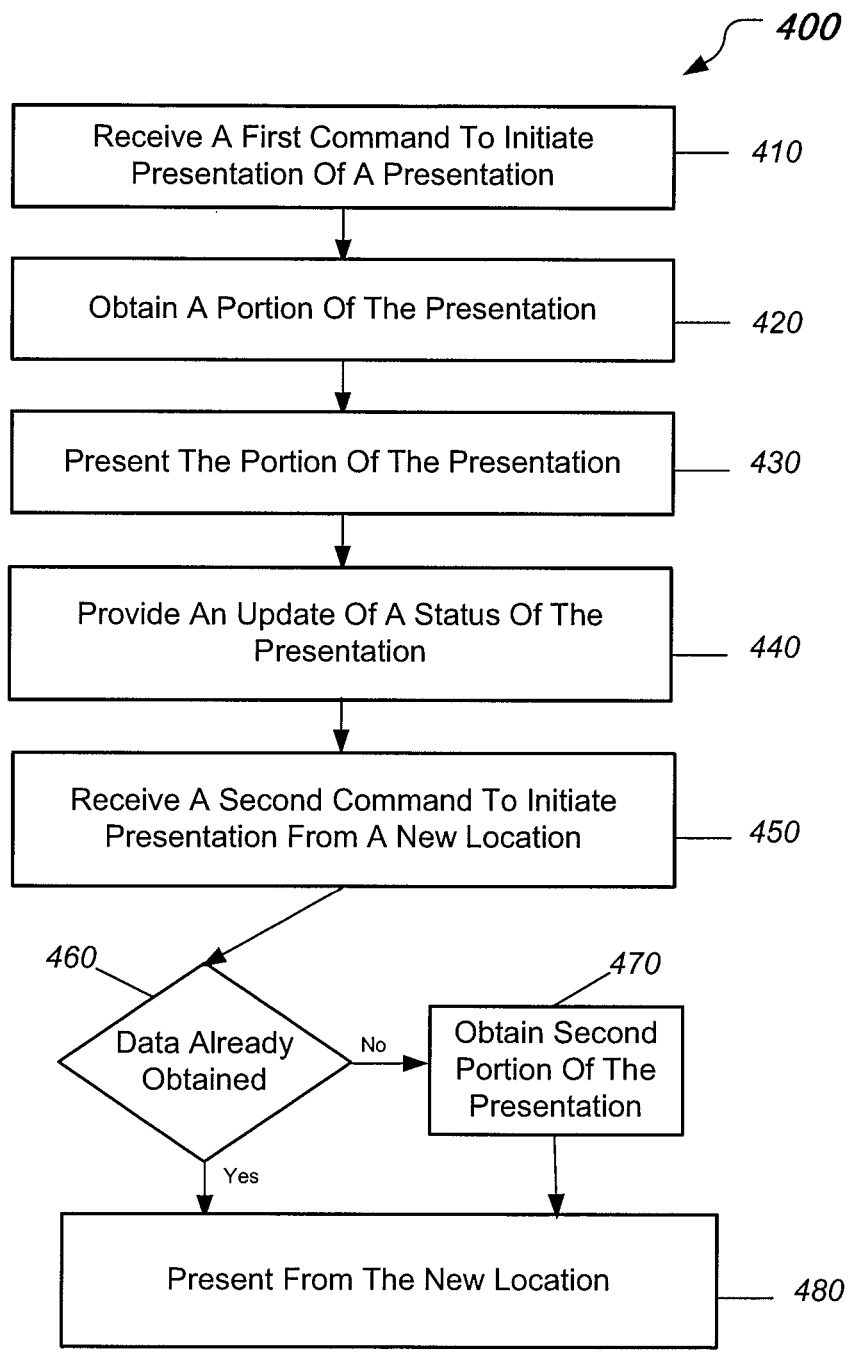
FIG. 4 shows an example process for presenting a media presentation.

FIG. 4 shows an example process 400 for presenting a media presentation. The media presentation is presented on a display device coupled with a media client. At 410, a first command to initiate presentation of a media presentation is received by the media client, the media presentation being stored on a mobile device. The command can include data for obtaining the media presentation and can include a playtime from which the media presentation should begin. For example, data (e.g., a URL or URI) can be received from the mobile device with an IP address of the mobile device, an asset ID of the media presentation stored on the mobile device, and a playtime. At 420, a portion of the media presentation is obtained. For example, a data package associated with the playtime can be requested from the mobile device such as through a request (e.g., an HTTP request). The media client receives the requested data package from the mobile device.

At 430, the portion of the media presentation is presented. The media client includes an application for presenting the portion of the media presentation. For example, for a video presentation the media client can include a video application for decoding the video and playing the video on the display device. At 440, the media client provides an update to the mobile device of a status of the presentation so the mobile device can track the progress of the playback. At 450, a second command to initiate presentation of the media presentation from a new location is received. For example, if the media presentation is scrubbed at the mobile device, the mobile device can provide a scrubbing destination to the media client from which presentation of the media presentation is to resume.

At 460, it is determined whether data associated with the new location has already been obtained by the media client. If it has then at 480 the media presentation is presented from the new location at the display device by the media client. If data associated with the new location has not been obtained then at 470 a second portion of the media presentation is obtained from the mobile device. For example, the media client can send a request for a portion of the media presentation associated with the new location. And, at 480, the presentation is presented at the display device from the new location by the media client.

Figure 5:
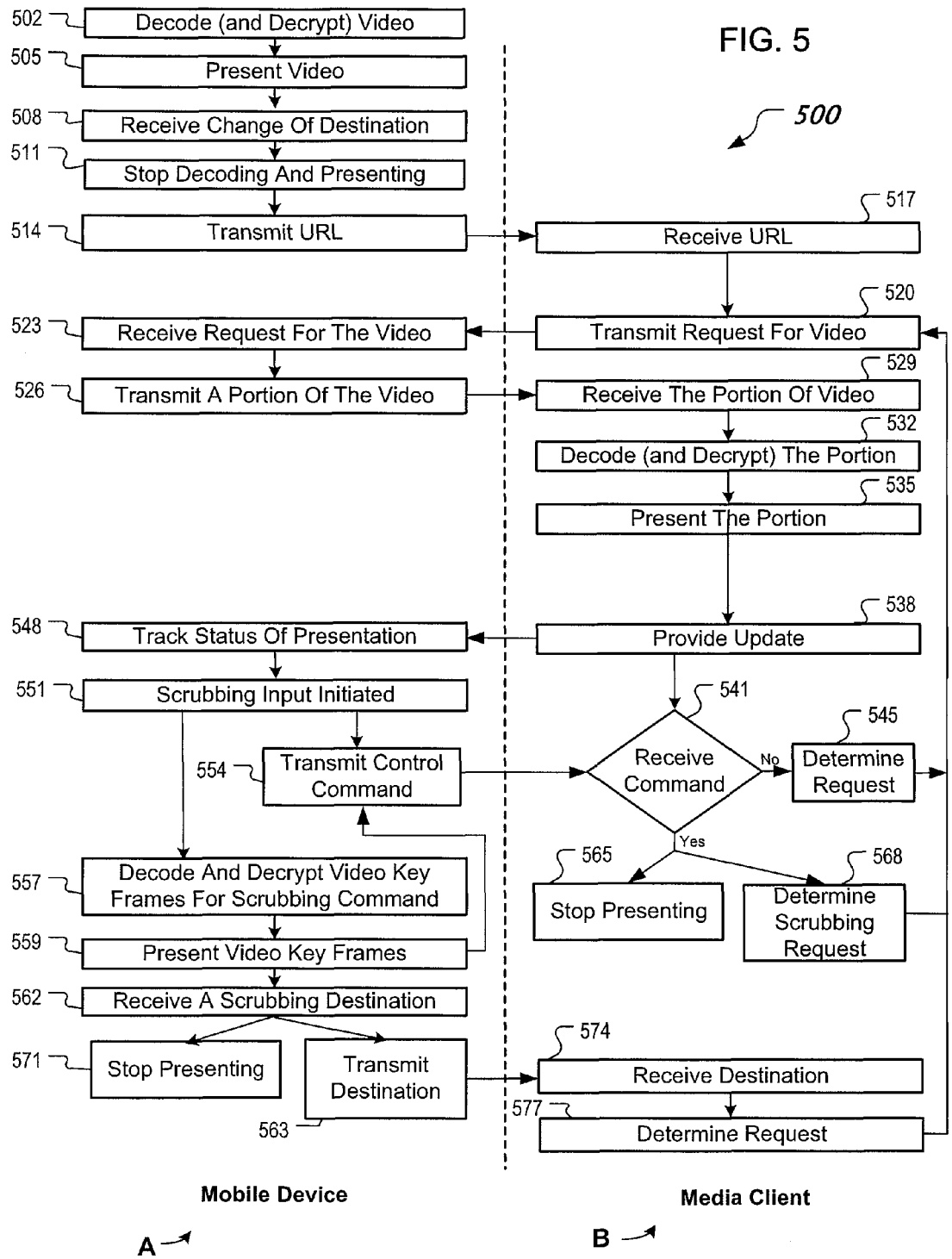
FIG. 5 shows an example flow diagram for presenting a video.

FIG. 5 shows an example flow diagram 500 for presenting a video. Flow diagram 500 is shown in the context of a video but is also applicable to other media content. FIG. 5 is divided in into two columns. Column A shows steps performed at a mobile device and column B shows steps performed at a media client. Steps 502-517 illustrate an example for initiating, from the mobile device, presentation of the video on the display device coupled to the media client. Steps 520-535 show an example of the media client obtaining portions of the video from the mobile device for presentation. Steps 538-577 show an example of scrubbing the video from the mobile device and optionally presenting the scrubbing on media client.

At 502, the mobile device decodes (and can decrypt if the video is encrypted) at least a portion of the video stored on the mobile device. The decoding (and decrypting) can be performed as the video is presented at 505 on a user interface on the mobile device. While the video is being presented, a command can be received at 508 by the mobile device to change the destination of the presentation from the mobile device to the media client. At 511, the mobile device stops decoding and presenting the video. At 514, the mobile device transmits data (e.g., a URL or URI) to the media client. The URL includes an IP address of the mobile device, an asset ID of the video stored on the mobile device, and a playtime indicating where the media presentation was stopped on the mobile device. The data can also include other data including frame rate of the video.

In some implementations, the mobile device can receive a command to initiate presentation of the video on a display device coupled with the media client without the video being currently played on the mobile device. In such an implementation, data can be transmitted to the media client with performing steps 502-511. The data, in such an implementation, includes the mobile device an address of the mobile device, an asset ID of the video stored on the mobile device, and a playtime. The playtime can be the beginning of the video or set by the user such as by scrubbing the video on the mobile device.

At 517, the URL is received by the media client. And, at 520, the media client transmits a request for a portion of the video based on the URL. The request is for the portion of the encoded video content starting from the playtime provided in the URL. The request can be in the form of an HTTP request from the media client. The media client can dictate the size of the video portion requested and the frequency at which it requests video etc. At 523, the request for the portion of the video is received by the mobile device. At 526, the mobile device transmits a portion of the video corresponding to the request to the media client. The portion of the video is encoded. In some examples, the portion of the video is also encrypted. At 529, the mobile device receives the portion of the encoded video. At 532, the media client decodes the portion of the video. If the portion of the video is encrypted, it also decrypts the portion of the video. At 535, the media client presents the decoded video on the display device coupled with the media client. During the presentation of the portion of the video, the media client provides updates at 538 to the mobile device regarding the playback of the presentation. Updates can include play state (e.g. paused, playing, rewinding), playback time, indication of latency for synchronization with the mobile device, etc. Also, during presentation of the video, the media client can buffer the video.

At 541, the media client can determine if a control command has been received from the mobile device. If not, the media client can determine a new request at 545 for another portion of the video such as the next segment of video sequentially. Steps 520-538 can be repeated for continuously obtaining portions of video data, buffering the video data and presenting the video until at 541 the media client receives a control command from the mobile device.

As mentioned previously, the media client provides updates to the mobile device regarding the presentation on the display device so that the mobile device can track at 548 the status of the presentation. At 551, a scrubbing input is initiated at the mobile device. For example, a user can touch a user interface on the mobile device to manipulate a control tool. At 557, the mobile device decodes (and decrypts if necessary) video frames for scrubbing. The mobile device knows which frames to start decoding based on the tracking performed at 548. In some example, as the user scrubs, only key frames associated with the scrubbing can be decoded (and decrypted). At 559, as the scrubbing input is received, the decoded (and decrypted) video frames are presented on the mobile device. When a scrubbing destination is received at 562, the scrubbing destination can be transmitted at 563 to the media client, such as via a URL.

In some implementations, when the scrubbing input is initiated and received, one or more control commands can be transmitted to the media client at 554. In some examples, the control command can be to suspend at 565 presentation of the video at the media client until a scrubbing destination is received. While the presentation of the video is suspended, the media client can continue to obtain and buffer video content. In some examples, the command can be for the media client to present scrubbing on the display device that tracks the scrubbing at the mobile device. In such a case, the command can include a URL that identifies the scrubbing frames decoded at 557; the media client can, at 568, determine a scrubbing request for video data for presenting frames associated with the scrubbing input. The steps 520-535 are performed as necessary to obtain dynamically the requested frames from the mobile device as the scrubbing input is received and to present on the display device the requested frames as the scrubbing input is received. In some examples, the media client may have already obtained a portion of the video associated with the scrubbing input, and can proceed directly to presenting the portion at 535 according to the scrubbing input.

When the scrubbing destination is received, the presentation at the mobile device can be stopped at 571 until a new scrubbing input is received. As mentioned above, when the scrubbing destination is received at 562, the destination is transmitted to the media client at 563. At 574, the scrubbing destination is received by the media client. The media client can determine a new request for a portion of the video associated with the scrubbing destination at 577. The media client can repeat steps 520-535 for the new request for the portion of the video associated with the scrubbing destination. The media client can continue to request portions of the video (e.g. at 545) so that the video can be presented seamlessly until a scrubbing input is received at the mobile device at 551. Then the video can be scrubbed as discussed in connection with 551-577.

Also, the complete video content and selected frames, such as key frames, can be protected differently so that one device can decrypt only the key frames while another device can decrypt the complete content. For example, when a mobile device decodes and decrypts video for scrubbing, it can decrypt using a first key that decrypts only certain frames such as key frames. When the media client decrypts media content for presentation, it can decrypt the media content using a second key that decrypts the complete content. As a result, when certain media content is only authorized to be presented in its complete form on a single display device (e.g. a rented movie), this media content can still be scrubbed and the scrubbing viewed at a different location (e.g. on the mobile device) by decoding and decrypting only the key frames for the scrubbing using the first key at the mobile device.

Example Mobile Device Architecture

Figure 6:
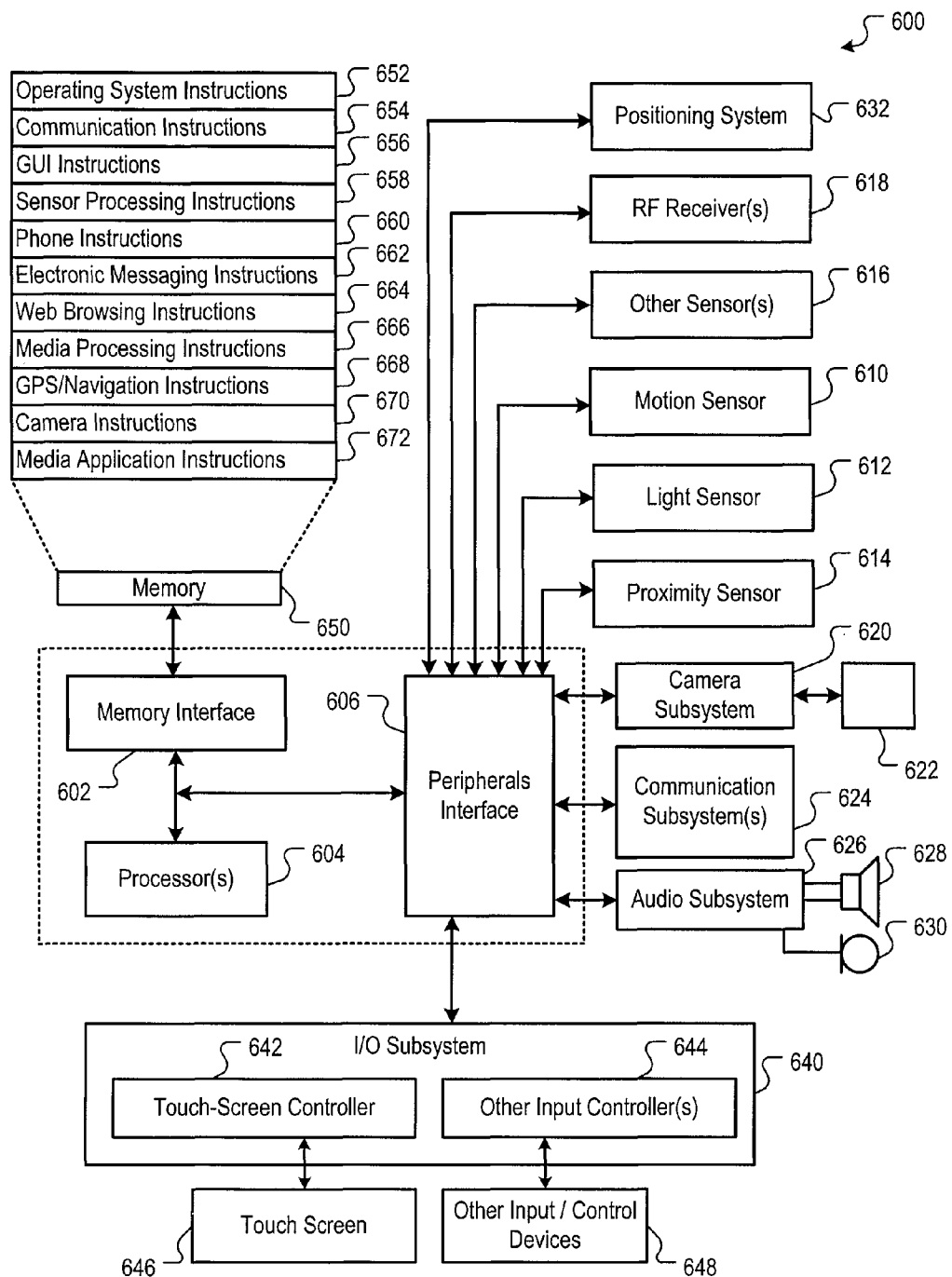
FIG. 6 is a block diagram of example hardware architecture of a mobile device.

FIG. 6 is a block diagram of example hardware architecture of mobile device 600 for implementing a media presentation of media content stored on mobile device 600 of media content on a display device coupled with a media client, as described in reference to FIGS. 1 and 2. Device 600 can include memory interface 602, one or more data processors, image processors and/or central processing units 604, and peripherals interface 606. Memory interface 602, one or more processors 604 and/or peripherals interface 606 can be separate components or can be integrated in one or more integrated circuits. The various components in device 600 can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate various orientation, lighting, and proximity functions. For example, in some implementations, light sensor 612 can be utilized to facilitate adjusting the brightness of touch screen 646. In some implementations, motion sensor 610 can be utilized to detect movement of the device. Accordingly, display objects and/or media can be presented according to a detected orientation, e.g., portrait or landscape.

Other sensors 616 can also be connected to peripherals interface 606, such as a temperature sensor, a biometric sensor, a gyroscope, or other sensing device, to facilitate related functionalities.

For example, device 600 can receive positioning information from positioning system 632. Positioning system 632, in various implementations, can be a component internal to device 600, or can be an external component coupled to device 600 (e.g., using a wired connection or a wireless connection). In some implementations, positioning system 632 can include a GPS receiver and a positioning engine operable to derive positioning information from received GPS satellite signals. In other implementations, positioning system 632 can include a compass (e.g., a magnetic compass) and an accelerometer, as well as a positioning engine operable to derive positioning information based on dead reckoning techniques. In still further implementations, positioning system 632 can use wireless signals (e.g., cellular signals, IEEE 802.11 signals) to determine location information associated with the device. Other positioning systems are possible.

Broadcast reception functions can be facilitated through one or more radio frequency (RF) receiver(s) 618. An RF receiver can receive, for example, AM/FM broadcasts or satellite broadcasts (e.g., XM® or Sirius® radio broadcast). An RF receiver can also be a TV tuner. In some implementations, RF receiver 618 is built into communication subsystems 624. In other implementations, RF receiver 618 is an independent subsystem coupled to device 600 (e.g., using a wired connection or a wireless connection). RF receiver 618 can receive simulcasts. In some implementations, RF receiver 618 can include a Radio Data System (RDS) processor, which can process broadcast content and simulcast data (e.g., RDS data). In some implementations, RF receiver 618 can be digitally tuned to receive broadcasts at various frequencies. In addition, RF receiver 618 can include a scanning function which tunes up or down and pauses at a next frequency where broadcast content is available.

Camera subsystem 620 and optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 624. Communication subsystem(s) 624 can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 624 can depend on the communication network(s) or medium(s) over which device 600 is intended to operate. For example, device 600 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 624 may include hosting protocols such that device 600 may be configured as a base station for other wireless devices. As another example, the communication subsystems can allow the device to synchronize with a host device using one or more protocols, such as, for example, the TCP/IP protocol, HTTP protocol, UDP protocol, and any other known protocol. The wireless communication subsystem 624 can be configured to communicate with, for example, a media client to provide URL information for the media client to obtain media content stored on the mobile device 600 using an HTTP request.

Audio subsystem 626 can be coupled to speaker 628 and one or more microphones 630. One or more microphones 630 can be used, for example, to facilitate voice-enabled functions, such as voice recognition, voice replication, digital recording, and telephony functions.

I/O subsystem 640 can include touch screen controller 642 and/or other input controller(s) 644. Touch-screen controller 642 can be coupled to touch screen 646. Touch screen 646 and touch screen controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 646 or proximity to touch screen 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of touch screen 646; and a pressing of the button for a second duration that is longer than the first duration may turn power to device 600 on or off. The user may be able to customize a functionality of one or more of the buttons. Touch screen 646 can, for example, also be used to implement virtual or soft buttons and/or a keyboard.

In some implementations, device 600 can present recorded audio and/or video files, such as MP3, AAC, and MPEG files. In some implementations, device 600 can include the functionality of an MP3 player.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can be a kernel (e.g., UNIX kernel).

Memory 650 may also store communication instructions 654 to facilitate communicating with one or more additional devices, one or more computers and/or one or more servers. Communication instructions 654 can also be used to select an operational mode or communication medium for use by the device, based on a geographic location (obtained by the GPS/Navigation instructions 668) of the device. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions, e.g., mapping a target location; and camera instructions 670 to facilitate camera-related processes and functions. Media application instructions 672 facilitate the features and processes, as described in reference to FIGS. 1-5. Memory 650 may also store other software instructions (not shown), such as web shopping instructions to facilitate web shopping-related processes and functions such as for web based media content such as movies and TV shows. In some implementations, media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of device 600 may be implemented in hardware and/or in software, including in one or more signal processing and/or application specific integrated circuits.

Example Network Operating Environment for a Mobile Device

Figure 7:
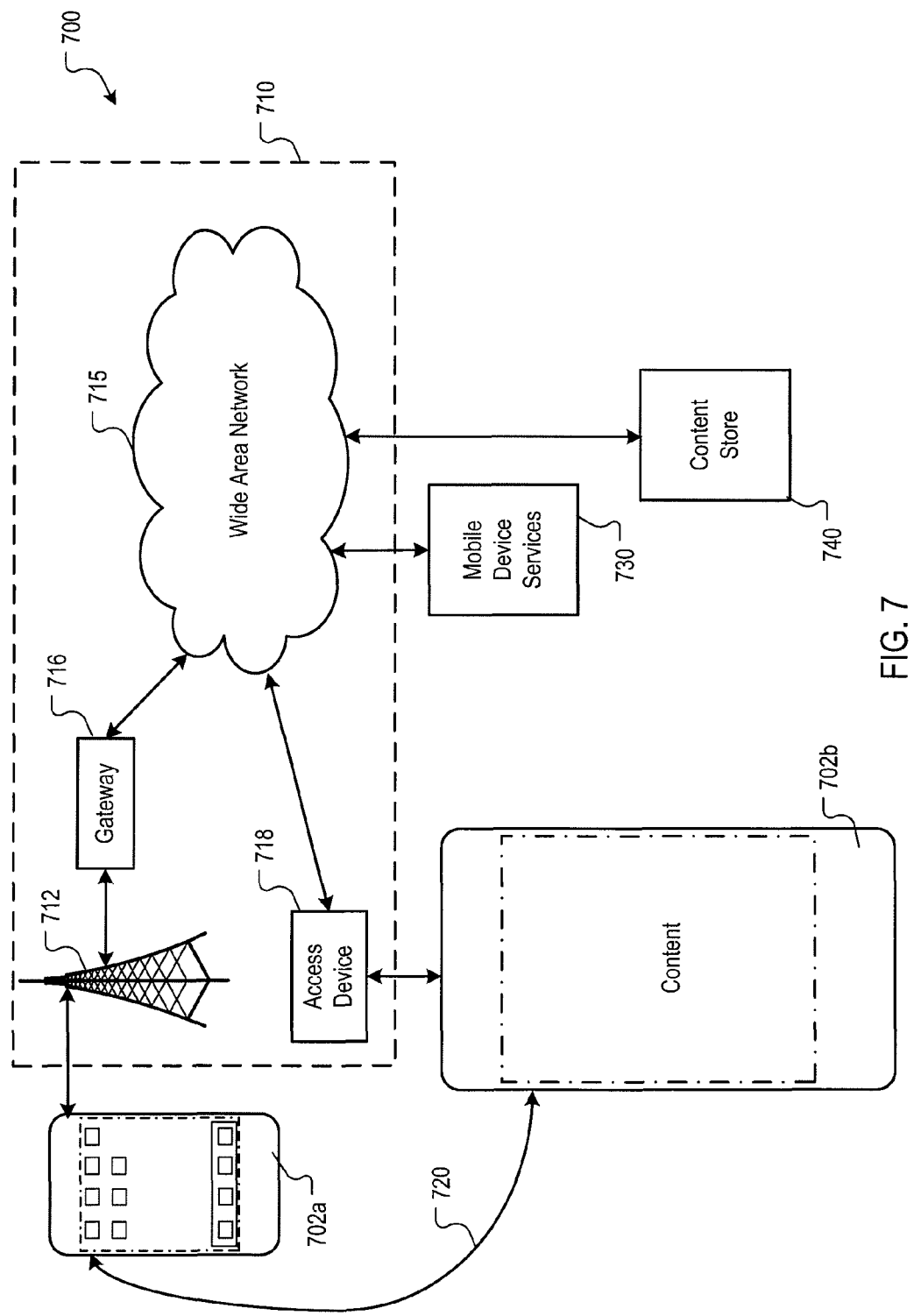
FIG. 7 is a block diagram of an example network operating environment for a mobile device.

FIG. 7 is a block diagram of an example network operating environment 700 for a mobile device. Devices 702a and 702b can, for example, communicate over one or more wired and/or wireless networks 710 in data communication. For example, wireless network 712, e.g., a cellular network, can communicate with wide area network (WAN) 715, such as the Internet, by use of gateway 716. Likewise, access device 718, such as a 502.11g wireless access device, can provide communication access to wide area network 715. In some implementations, both voice and data communications can be established over wireless network 712 and access device 718. For example, device 702*a* can place and receive phone calls (e.g., using VoIP protocols), send and receive e-mail messages (e.g., using POP3 protocol), and retrieve electronic documents and/or streams, such as web pages, photographs, and videos, over wireless network 712, gateway 716, and wide area network 715 (e.g., using TCP/IP or UDP protocols). Likewise, in some implementations, device 702*b* can place and receive phone calls, send and receive e-mail messages, and retrieve electronic documents over access device 718 and wide area network 715. In some implementations, devices 702*a* or 702*b* can be physically connected to access device 718 using one or more cables and access device 718 can be a personal computer. In this configuration, device 702*a* or 702*b* can be referred to as a "tethered" device.

Devices 702*a* and 702*b* can also establish communications by other means. For example, wireless device 702*a* can communicate with other wireless devices, e.g., other devices 702*a* or 702*b*, cell phones, etc., over wireless network 712. Likewise, devices 702*a* and 702*b* can establish peer-to-peer communications 720, e.g., a personal area network, by use of one or more communication subsystems, such as a Bluetooth™ communication device. Other communication protocols and topologies can also be implemented.

Devices 702*a* or 702*b* can, for example, communicate with one or more services over one or more wired and/or wireless networks 710. These services can include, for example, mobile services 730 and content store 740. Mobile services 730 provide various services for mobile devices, such as storage, syncing, an electronic store for downloading electronic media such a video content or any other desired service. Content store 740 provides a web application for providing devices 702*a* and/or 702*b* with media content such as video downloads for purchase and/or rent.

Device 702*a* or 702*b* can also access other data and content over one or more wired and/or wireless networks 710. For example, content publishers, such as news sites, RSS feeds, web sites, blogs, social networking sites, developer networks, etc., can be accessed by device 702*a* or 702*b*. Such access can be provided by invocation of a web browsing function or application (e.g., a browser) in response to a user touching, for example, a Web object.

Example Media Client Architecture

Figure 8:
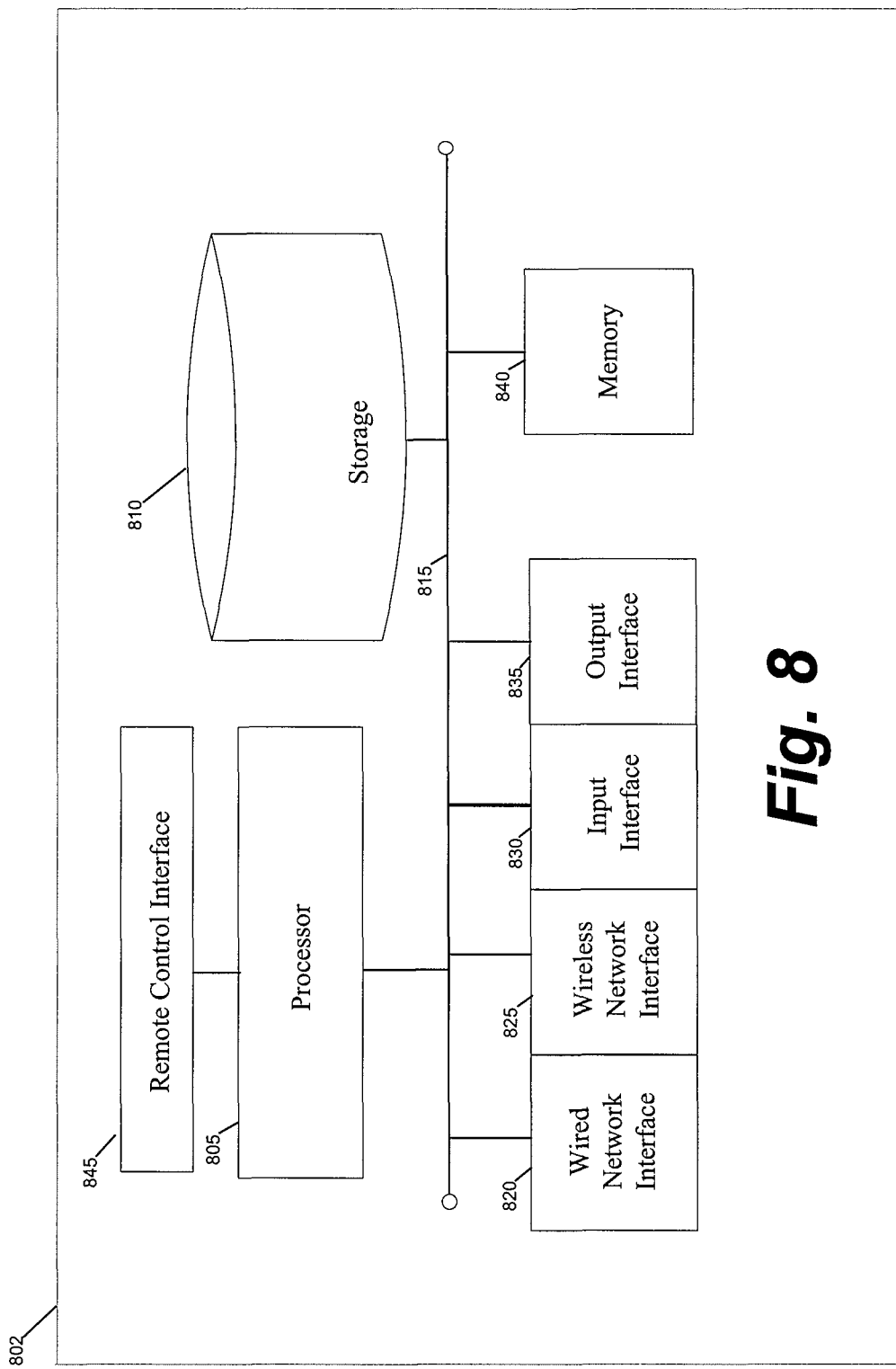
FIG. 8 shows an exemplary architecture of a media client.

FIG. 8 shows an exemplary architecture of media client 802, which includes processor 805 configured to control the operation of media client 802. For example, processor 805 can control communications with a mobile device to receive media for playback. The media can be received through push and/or pull operations from the mobile device, including through downloading and streaming. Processor 805 also can be configured to generate requests such as HTTP requests for data from the mobile device.

Media client 802 also includes storage device 810 that can be configured to store information including media, configuration data, user preferences, and operating instructions. Storage device 810 can be any type of non-volatile storage, including a hard disk device or a solid-state drive. For example, media received from mobile device can be stored on storage device 810. The received media thus can be locally accessed and processed such as decoded and decrypted for presentation. Further, configuration information, such as the resolution of the display device coupled with the media client 802 can be stored on storage device 810. Additionally, storage device 810 can include one or more sets of operating instructions that can be executed by processor 805 to control operation of media client 802. Storage device 810 can also include program code for one or more programs configured to present media content obtained from mobile device. Examples of programs include, a video player, a program for presenting a slide show (e.g. music and photographs), etc. In an implementation, storage device 810 further can be divided into a plurality of partitions, wherein each partition can be utilized to store one or more types of information. Additionally, each partition can have one or more access control provisions.

Communication bus 815 couples the processor 805 to the other components and interfaces included in media client 802. Communication bus 815 can be configured to permit unidirectional and/or bidirectional communication between the components and interfaces. For example, processor 805 can retrieve information from and transmit information to storage device 810 over communication bus 815. In an implementation, communication bus 815 can be comprised of a plurality of busses, each of which couples at least one component or interface of media client 802 with another component or interface.

Media client 802 also includes a plurality of input and output interfaces for communicating with other devices, including media servers and presentation devices. A wired network interface 820 and a wireless network interface 825 each can be configured to permit the media client 802 to transmit and receive information over a network, such as a local area network (LAN) or the Internet. Wireless network interface 825 can also be configured to permit direct peer-to-peer communication with mobile device. Additionally, input interface 830 can be configured to receive input from another device through a direct connection, such as a USB, eSATA or an IEEE 1394 connection.

Further, output interface 835 can be configured to couple the media client 802 to one or more external devices, including a television, a monitor, an audio receiver, and one or more speakers. For example, output interface 835 can include one or more of an optical audio interface, an RCA connector interface, a component video interface, and a High-Definition Multimedia Interface (HDMI). Output interface 835 also can be configured to provide one signal, such as an audio stream, to a first device and another signal, such as a video stream, to a second device. Further, non-volatile memory 840, such as a read-only memory (ROM) also can be included in the media client 802. Non-volatile memory 840 can be used to store configuration data, additional instructions, such as one or more operating instructions, and values, such as one or more flags and counters. In an implementation, a random access memory (RAM) also can be included in media client 802. The RAM can be used to store media content received in media client 802, such as during playback or while the user has paused playback. Further, media content can be stored in the RAM whether or not the media content is stored on storage device 810.

Additionally, media client 802 can include remote control interface 845 that can be configured to receive commands from one or more remote control devices (not pictured). Remote control interface 845 can receive the commands through wireless signals, such as infrared and radio frequency signals. The received commands can be utilized, such as by processor 805, to control media playback or to configure media client 802. In an implementation, media client 802 can be configured to receive commands from a user through a touch screen interface. Media client 802 also can be configured to receive commands through one or more other input devices, including a keyboard, a keypad, a touch pad, a voice command system, and a mouse.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, while the examples described herein discuss providing a media presentation to a media client for presentation on the media client, in some examples multiple media presentations or multiple types of media content can be simultaneously provided to the media client for simultaneous presentation. Examples can include providing for presentation a video, breaking news, and advertisements each of which can be controlled from the mobile device. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer implemented method comprising:
presenting, by a mobile device, a video on the mobile device;
receiving a command during the presenting to change a destination of presentation from the mobile device to a display device in communication with a media client;
in response to receiving the command to change the destination of presentation,
providing, by the mobile device to the media client, data for obtaining a first portion of the video and for controlling presentation of the first portion of the video on the display device by the media client, wherein the first portion of the video is associated with a time in the video when the command to change the destination was received, and stopping the presenting of the video on the mobile device;
receiving updates from the media client regarding a status of the controlling of the presentation at the display device by the media client;
receiving, at the mobile device, a scrubbing input for controlling a scrubbing of the video to a scrubbing destination, as the first portion of the video is presented on the display device;
in response to receiving, at the mobile device, the scrubbing input, resuming presenting the video at the mobile device based on the received updates:
providing, by the mobile device, a scrubbing command to the media client for controlling the scrubbing of the video to the scrubbing destination;
receiving, by the mobile device from the media client, a request for a second portion of the video associated with the scrubbing destination; and
providing, by the mobile device to the media client, data for obtaining the second portion of the video and for controlling presentation of the second portion of the video on the display device from the scrubbing destination.

2. The method of claim 1, wherein
providing data for obtaining a first portion of the video comprises:
transmitting from the mobile device an identifier of a time location for playback on the display device; and
the method further comprises:
receiving a request from the media client for the first portion of the video, the first portion of the video associated with the time location for playback; and
transmitting from the mobile device the first portion of the video.

3. The method of claim 1, comprising:
displaying frames of the video on the mobile device associated with the scrubbing input including a destination frame associated with the scrubbing destination, and
wherein the providing of the second portion of the video comprises transmitting, by the mobile device to the media client, the destination frame.

4. The method of claim 3,
further comprising decoding at the mobile device only key frames of the video associated with the scrubbing input; and
wherein the displaying of the frames of the video on the mobile device comprises displaying the key frames of the video associated with the scrubbing input.

5. The method of claim 1, wherein
the request for the second portion of the video comprises a request for frames of the video associated with the scrubbing destination, and
the providing of the second portion of the video comprises transmitting, by the mobile device to the media client, the frames of the video associated with the scrubbing destination.

6. The method of claim 1, further comprising:
decoding the video on the mobile device;
in response to receiving the command to change the destination, stopping the decoding of the video on the mobile device; and
wherein the providing of the portion of the video associated with the time in the video when the command to change the destination was received comprises providing an encoded portion of the video.

7. The method of claim 1, wherein
the video comprises audio content; and
the method further comprises:
presenting the audio content on the mobile device; and
receiving a command during the presenting to change presentation of the audio content from the mobile device to an audio device different from the display device.

8. The method of claim 1, wherein providing data for obtaining a first portion of the video comprises transmitting from the mobile device a uniform resource locator (URL) or a uniform resource identifier (URI) that includes an IP address where the first portion of the video is stored, an asset identifier of the stored first portion of the video, and an identifier of a time location for playback on the display device.

9. The method of claim 1, wherein
the request for the second portion of the video comprises a request for frames of the video associated with the scrubbing destination, and
providing data for obtaining the second portion of the video comprises transmitting from the mobile device a uniform resource locator (URL) or a uniform resource identifier (URI) that includes an IP address where the frames of the video associated with the scrubbing destination are stored, and asset identifiers of the stored frames.

10. The method of claim 1, further comprising:
decoding the video on the mobile device;
in response to receiving the command to change the destination, stopping the decoding of the video on the mobile device; and
wherein providing data for obtaining a first portion of the video comprises transmitting from the mobile device a uniform resource locator (URL) or a uniform resource identifier (URI) that includes an IP address where an encoded first portion of the video is stored, an asset identifier of the stored encoded first portion of the video, and an identifier of a time location for playback on the display device.

11. A system comprising:
a mobile device comprising:
a mobile device display,
a mobile device processor, and
a mobile device transceiver; and
a media client coupled with a display device comprising:
a media client transceiver in communication with the mobile device transceiver to receive a video from the mobile device,
a media client processor, and
a media client storage device, storing an application for presenting the video received from the mobile device on the display device;
wherein the mobile device processor is programmed to send over the mobile device transceiver a command to the media client that identifies a playback location in the video;
wherein the media client processor is programmed to request a first portion of the video associated with the playback location from the mobile device; and
wherein the mobile device processor is further programmed to:
transmit the requested first portion of the video to the media client for presentation on a display device coupled with the media client, and
provide control commands to the media client for controlling the presentation of the video.

12. The system of claim 11, wherein
the mobile device processor is further configured to:
- receive a scrubbing input while the first portion is being presented by the media client on the display device;
- display frames of the video based on the scrubbing input while the scrubbing input is received; and
- upon receiving a destination scrubbing input, transmitting a new playback location to the media client; and the media client processor is configured to transmit a request for a second portion of the video associated with the new playback location.

13. The system of claim 11, the mobile device is configured to
- present the video on the mobile device;
- receive a command during presentation of the video to change destination of presentation from the mobile device to the display device;
- in response to the received command, stop presentation on the mobile device; and
- provide, as part of transmission of the first portion of the video, a portion of the video associated with a time in the video when the command to change the destination was received.

14. The system of claim 13, the mobile device is configured to
- stop presentation of the video on the mobile device in response to the received command to change the destination of presentation;
- receive updates from the media client regarding a status of the controlling of the presentation at the display device by the media client; and
- in response to the received command, resume the presentation of the video at the mobile device based on the received updates.

15. The system of claim 13, wherein
the video is encoded;
the mobile device is configured to
- decode the video on the mobile device, and in response to the received command,
- stop decoding of the video on the mobile device; and
- provide an encoded portion of the video as part of providing the portion of the video associated with the time in the video when the command to change the destination was received.

* * * * *